United States Patent
Mosier et al.

(10) Patent No.: US 12,275,912 B2
(45) Date of Patent: *Apr. 15, 2025

(54) LUBRICANT COMPOSITIONS FOR DIRECT INJECTION ENGINE

(71) Applicant: The Lubrizol Corporation, Wickliffe, OH (US)

(72) Inventors: Patrick E. Mosier, Bay Village, OH (US); Jeffry G. Dietz, Shaker Heights, OH (US); Alexander Sammut, Chardon, OH (US); Mary Galic Raguz, Mentor, OH (US); Matthew D. Gieselman, Wickliffe, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,845

(22) Filed: Feb. 13, 2023

(65) Prior Publication Data

US 2023/0183597 A1    Jun. 15, 2023

Related U.S. Application Data

(63) Continuation of application No. 17/010,932, filed on Sep. 3, 2020, now Pat. No. 11,608,478, which is a continuation of application No. 15/560,181, filed as application No. PCT/US2016/023513 on Mar. 22, 2016, now Pat. No. 10,800,992.

(60) Provisional application No. 62/137,976, filed on Mar. 25, 2015.

(51) Int. Cl.
| | | |
|---|---|---|
| C10M 169/04 | (2006.01) | |
| C10M 101/00 | (2006.01) | |
| C10M 129/10 | (2006.01) | |
| C10M 133/06 | (2006.01) | |
| C10M 133/56 | (2006.01) | |
| C10M 155/04 | (2006.01) | |
| C10M 161/00 | (2006.01) | |
| F02M 21/02 | (2006.01) | |
| C10N 10/04 | (2006.01) | |
| C10N 20/04 | (2006.01) | |
| C10N 30/00 | (2006.01) | |
| C10N 30/04 | (2006.01) | |
| C10N 30/10 | (2006.01) | |
| C10N 40/25 | (2006.01) | |
| C10N 60/14 | (2006.01) | |

(52) U.S. Cl.
CPC ...... *C10M 169/044* (2013.01); *C10M 101/00* (2013.01); *C10M 129/10* (2013.01); *C10M 133/06* (2013.01); *C10M 133/56* (2013.01); *C10M 155/04* (2013.01); *C10M 161/00* (2013.01); *C10M 169/041* (2013.01); *F02M 21/0215* (2013.01); C10M 2203/003 (2013.01); C10M 2203/1025 (2013.01); C10M 2207/023 (2013.01); C10M 2207/026 (2013.01); C10M 2207/028 (2013.01); C10M 2215/064 (2013.01); C10M 2215/26 (2013.01); C10M 2215/28 (2013.01); C10M 2219/046 (2013.01); C10M 2219/089 (2013.01); C10M 2229/00 (2013.01); C10N 2010/04 (2013.01); C10N 2020/04 (2013.01); C10N 2030/00 (2013.01); C10N 2030/04 (2013.01); C10N 2030/10 (2013.01); C10N 2030/40 (2020.05); C10N 2030/42 (2020.05); C10N 2030/43 (2020.05); C10N 2030/45 (2020.05); C10N 2040/25 (2013.01); C10N 2040/255 (2020.05); C10N 2060/14 (2013.01); Y02T 10/30 (2013.01)

(58) Field of Classification Search
CPC ............ C10M 169/044; C10M 101/00; C10M 129/10; C10M 133/06; C10M 133/56; C10M 155/04; C10M 161/00; C10M 169/041; C10M 2203/003; C10M 2203/1025; C10M 2207/023; C10M 2207/026; C10M 2207/028; C10M 2215/064; F02M 21/0215
See application file for complete search history.

(56) References Cited

U.S. PATENT DOCUMENTS

| | | | | |
|---|---|---|---|---|
| 10,800,992 B2 * | 10/2020 | Mosier | ............... | F02M 21/0215 |
| 11,608,478 B2 * | 3/2023 | Mosier | ................ | C10M 161/00 |
| 2015/0322367 A1 * | 11/2015 | Patel | .................... | C10M 137/02 |
| | | | | 508/306 |
| 2015/0322368 A1 * | 11/2015 | Patel | .................... | C10M 133/16 |
| | | | | 508/192 |
| 2015/0322369 A1 * | 11/2015 | Patel | .................... | C10M 129/68 |
| | | | | 508/192 |
| 2016/0075967 A1 * | 3/2016 | Gao | ...................... | C10M 107/34 |
| | | | | 508/459 |
| 2016/0230115 A1 * | 8/2016 | Mosier | ................. | C10M 135/04 |
| 2017/0022441 A1 * | 1/2017 | Onodera | ............... | C10M 141/12 |
| 2017/0204348 A1 * | 7/2017 | Tamura | ................ | C10M 169/04 |

* cited by examiner

*Primary Examiner* — Ellen M McAvoy

(74) *Attorney, Agent, or Firm* — Michael Miller

(57) ABSTRACT

The invention is directed to a method for reducing low speed pre-ignition events in a spark-ignited direct injection internal combustion engine by supplying to the sump a lubricant composition which contains an oil of lubricating viscosity and an ashless dispersant. The ashless dispersant may be selected from succinimide compounds prepared from aliphatic or aromatic amines.

15 Claims, No Drawings

LUBRICANT COMPOSITIONS FOR DIRECT INJECTION ENGINE

CROSS-REFERENCE TO RELATED APPLICATION

This application is a continuation application of application Ser. No. 17/010,932 filed on Sep. 3, 2020, which is a continuation application of application Ser. No. 15/560,181 filed on Sep. 21, 2017, now as U.S. Pat. No. 10,800,992 issued on Oct. 13, 2020, which is a 371 of International Application Serial No. PCT/US2016/023513 filed on Mar. 22, 2016, which claims benefit of Provisional Application Ser. No. 62/137,976 filed on Mar. 25, 2015.

BACKGROUND OF THE INVENTION

The disclosed technology relates to lubricants for internal combustion engines, particularly those for spark-ignited direct injection engines.

Modern engine designs are being developed to improve fuel economy without sacrificing performance or durability. Historically, gasoline was port-fuel injected (PFI), that is, injected through the air intake and entering the combustion chamber via the air intake valve. Gasoline direct injection (GDI) involves direct injection of gasoline into the combustion chamber.

In certain situations, the internal combustion engine may exhibit abnormal combustion. Abnormal combustion in a spark-initiated internal combustion engine may be understood as an uncontrolled explosion occurring in the combustion chamber as a result of ignition of combustible elements therein by a source other than the igniter.

Pre-ignition may be understood as an abnormal form of combustion resulting from ignition of the air-fuel mixture prior to ignition by the igniter. Anytime the air-fuel mixture in the combustion chamber is ignited prior to ignition by the igniter, such may be understood as pre-ignition. It will also be understood that ignition events generally increase in likelihood as the air-fuel ratio becomes leaner. As such, one approach to preventing pre-ignition events in GDI engines has been to intentionally inject additional fuel (i.e., to overfuel), thereby adjusting the air-fuel ratio to a richer mixture that is less favorable to pre-ignition events. This approach has successfully treated LSPI, but more current fuel efficiency and economy standards are causing engine manufacturers to adopt leaner air-fuel mixtures, which leads to the need for alternative approaches to preventing or reducing LSPI events.

Without being bound to a particular theory, traditionally, pre-ignition has occurred during high speed operation of an engine when a particular point within the combustion chamber of a cylinder may become hot enough during high speed operation of the engine to effectively function as a glow plug (e.g. overheated spark plug tip, overheated burr of metal) to provide a source of ignition which causes the air-fuel mixture to ignite before ignition by the igniter. Such pre-ignition may be more commonly referred to as hot-spot pre-ignition, and may be inhibited by simply locating the hot spot and eliminating it.

More recently, vehicle manufacturers have observed intermittent abnormal combustion in their production of turbocharged gasoline engines, particularly at low speeds and medium-to-high loads. More particularly, when operating the engine at speeds less than or equal to 3,000 rpm and under a load with a brake mean effective pressure (BMEP) of greater than or equal to 10 bars, a condition which may be referred to as low-speed pre-ignition (LSPI) may occur in a very random and stochastic fashion.

The disclosed technology provides a method for reducing, inhibiting, or even eliminating LSPI events in direct injection engines by operating the engines with a lubricant that contains a boron-containing ashless dispersant. As used herein, the expression "boron-containing ashless dispersant" is intended to include dispersants that are free of metal other than incidental amounts that may be incorporated from production or synthesis (i.e. amounts less than 500 ppm by weight of the dispersant, or less than 300 ppm, or less than 100 ppm by weight of the dispersant).

SUMMARY OF THE INVENTION

The present invention provides a method for reducing low speed pre-ignition events in a spark-ignited direct injection internal combustion engine comprising supplying to the sump a lubricant composition which contains an oil of lubricating viscosity and a boron-containing ashless dispersant. The boron-containing ashless dispersant may be a polyisobutylene succinimide compound.

DETAILED DESCRIPTION

Various preferred features and embodiments will be described below by way of non-limiting illustration.

As indicated above, when operating the engine at speeds less than or equal to 3,000 rpm and under a load with a brake mean effective pressure (BMEP) of greater than or equal to 10 bars, a low-speed pre-ignition (LSPI) event may occur in the engine. A LSPI event may consist of one or more LSPI combustion cycles, and generally consists of multiple LSPI combustion cycles which occur in a consecutive fashion or alternating fashion with normal combustion cycles in between. Without being bound to a particular theory, LSPI may result from a combustion of oil droplet(s), or a droplet(s) of oil-fuel mixture, or combinations thereof, which may accumulate, for example, in the top land crevices volume of a piston, or the piston ring-land and ring-groove crevices. The lubricant oil may be transferred from below the oil control ring to the piston top land area due to unusual piston ring movements. At low speed, high load conditions, in-cylinder pressures dynamics (compression and firing pressures) may be considerably different from in-cylinder pressures at lower loads, particularly due to strongly retarded combustion phasing and high boost and peak compression pressures which can influence ring motion dynamics.

At the foregoing loads, LSPI, which may be accompanied by subsequent detonation and/or severe engine knock, can cause severe damage to the engine very quickly (often within 1 to 5 engine cycles). Engine knock may occur with LSPI given that, after the normal spark from the igniter is provided, multiple flames may be present. The present invention aims to provide a method for inhibiting or reducing LSPI events, the method involving supplying to the engine a lubricant composition comprising a boron-containing ashless dispersant.

In one embodiment of the invention, the engine is operated at speeds between 500 rpm and 3000 rpm, or 800 rpm to 2800 rpm, or even 1000 rpm to 2600 rpm. Additionally, the engine may be operated with a brake mean effective pressure of 10 bars to 30 bars, or 12 bars to 24 bars.

LSPI events, while comparatively uncommon, may be catastrophic in nature. Hence drastic reduction or even elimination of LSPI events during normal or sustained operation of a direct fuel injection engine is desirable. In one embodiment, the method of the invention is such that there are less than 20 LSPI events per 100,000 combustion events or less than 10 LSPI events per 100.000 combustion events. In one embodiment, there may be less than 5 LSPI events per 100.000 combustion events, less than 3 LSPI events per 100.000 combustion events; or there may be 0 LSPI events per 100.000 combustion events.

Fuel

The method of the present invention involves operating a spark-ignited internal combustion engine. In addition to the engine operating conditions and the lubricant composition, the composition of the fuel may impact LSPI events. In one embodiment, the fuel may comprise a fuel which is liquid at ambient temperature and is useful in fueling a spark ignited engine, a fuel which is gaseous at ambient temperatures, or combinations thereof.

The liquid fuel is normally a liquid at ambient conditions e.g., room temperature (20 to 30° C.). The fuel can be a hydrocarbon fuel, a nonhydrocarbon fuel, or a mixture thereof. The hydrocarbon fuel may be a gasoline as defined by ASTM specification D4814. In an embodiment of the invention the fuel is a gasoline, and in other embodiments the fuel is a leaded gasoline, or a nonleaded gasoline.

The non-hydrocarbon fuel can be an oxygen containing composition, often referred to as an oxygenate, to include an alcohol, an ether, a ketone, an ester of a carboxylic acid, a nitroalkane, or a mixture thereof. The nonhydrocarbon fuel can include for example methanol, ethanol, methyl t-butyl ether, methyl ethyl ketone, transesterified oils and/or fats from plants and animals such as rapeseed methyl ester and soybean methyl ester, and nitromethane. Mixtures of hydrocarbon and nonhydrocarbon fuels can include, for example, gasoline and methanol and/or ethanol. In an embodiment of the invention, the liquid fuel is a mixture of gasoline and ethanol, wherein the ethanol content is at least 5 volume percent of the fuel composition, or at least 10 volume percent of the composition, or at least 15 volume percent, or 15 to 85 volume percent of the composition. In one embodiment, the liquid fuel contains less than 15% by volume ethanol content, less than 10% by volume ethanol content, less than 5% ethanol content by volume, or is substantially free of (i.e. less than 0.5% by volume) of ethanol.

In several embodiments of this invention, the fuel can have a sulfur content on a weight basis that is 5000 ppm or less, 1000 ppm or less, 300 ppm or less, 200 ppm or less, 30 ppm or less, or 10 ppm or less. In another embodiment, the fuel can have a sulfur content on a weight basis of 1 to 100 ppm. In one embodiment, the fuel contains about 0 ppm to about 1000 ppm, about 0 to about 500 ppm, about 0 to about 100 ppm, about 0 to about 50 ppm, about 0 to about 25 ppm, about 0 to about 10 ppm, or about 0 to 5 ppm of alkali metals, alkaline earth metals, transition metals or mixtures thereof. In another embodiment the fuel contains 1 to 10 ppm by weight of alkali metals, alkaline earth metals, transition metals or mixtures thereof.

The gaseous fuel is normally a gas at ambient conditions e.g., room temperature (20 to 30° C.). Suitable gas fuels include natural gas, liquefied petroleum gas (LPG), compressed natural gas (CNG), or mixtures thereof. In one embodiment, the engine is fueled with natural gas.

The fuel compositions of the present invention can further comprise one or more performance additives. Performance additives can be added to a fuel composition depending on several factors, including the type of internal combustion engine and the type of fuel being used in that engine, the quality of the fuel, and the service conditions under which the engine is being operated. In some embodiments, the performance additives are free of nitrogen. In other embodiments, the additional performance additives may contain nitrogen.

The performance additives can include an antioxidant such as a hindered phenol or derivative thereof and/or a diarylamine or derivative thereof, a corrosion inhibitor such as an alkenylsuccinic acid; and/or a detergent/dispersant additive, such as a polyetheramine or nitrogen containing detergent, including but not limited to polyisobutylene (PIB) amine dispersants, Mannich detergents, succinimide dispersants, and their respective quaternary ammonium salts.

The performance additives may also include a cold flow improver, such as an esterified copolymer of maleic anhydride and styrene and/or a copolymer of ethylene and vinyl acetate; a foam inhibitor, such as a silicone fluid; a demulsifier such as a polyoxyalkylene and/or an alkyl polyether alcohol; a lubricity agent such as a fatty carboxylic acid, ester and/or amide derivatives of fatty carboxylic acids, or ester and/or amide derivatives of hydrocarbyl substituted succinic anhydrides; a metal deactivator, such as an aromatic triazole or derivative thereof, including but not limited to a benzotriazole such as tolytriazole; and/or a valve seat recession additive, such as an alkali metal sulfosuccinate salt. The additives may also include a biocide, an antistatic agent, a deicer, a fluidizer, such as a mineral oil and/or a poly(alpha-olefin) and/or a polyether, and a combustion improver, such as an octane or cetane improver.

The fluidizer may be a polyetheramine or a polyether compound. The polyetheramine can be represented by the formula $R[-OCH_2CH(R^1)]_nA$, where R is a hydrocarbyl group, $R^1$ is selected from the group consisting of hydrogen, hydrocarbyl groups of 1 to 16 carbon atoms, and mixtures thereof, n is a number from 2 to about 50, and A is selected from the group consisting of $-OCH_2CH_2CH_2NR^2R^2$ and $-NR^3R^3$, where each $R^2$ is independently hydrogen or hydrocarbyl, and each $R^3$ is independently hydrogen, hydrocarbyl or $-[R^4N(R^5)]_pR^6$, where $R^4$ is $C_2$-$C_{10}$ alkylene, $R^5$ and $R^6$ are independently hydrogen or hydrocarbyl, and p is a number from 1-7.

The fluidizer can be a polyether, which can be represented by the formula $R^7O[CH_2CH(R^8)O]_qH$, where $R^7$ is a hydrocarbyl group, $R^8$ is selected from the group consisting of hydrogen, hydrocarbyl groups of 1 to 16 carbon atoms, and mixtures thereof, and q is a number from 2 to about 50. The fluidizer can be a hydrocarbyl-terminated poly-(oxyalkylene) aminocarbamate as described U.S. Pat. No. 5,503,644. The fluidizer can be an alkoxylate, wherein the alkoxylate can comprise: (i) a polyether containing two or more ester terminal groups; (ii) a polyether containing one or more ester groups and one or more terminal ether groups; or (iii) a polyether containing one or more ester groups and one or more terminal amino groups, wherein a terminal group is defined as a group located within five connecting carbon or oxygen atoms from the end of the polymer. Connecting is defined as the sum of the connecting carbon and oxygen atoms in the polymer or end group.

The performance additives which may be present in the fuel additive compositions and fuel compositions of the present invention also include di-ester, di-amide, ester-amide, and ester-imide friction modifiers prepared by reacting a dicarboxylic acid (such as tartaric acid) and/or a tricarboxylic acid (such as citric acid), with an amine and/or alcohol, optionally in the presence of a known esterification catalyst. These friction modifiers often derived from tartaric acid, citric acid, or derivatives thereof may be derived from amines and/or alcohols that are branched so that the friction modifier itself has significant amounts of branched hydrocarbyl groups present within it structure. Examples of suitable branched alcohols used to prepare these friction modifiers include 2-ethylhexanol, isotridecanol, Guerbet alcohols, or mixtures thereof.

In different embodiments the fuel composition may have a composition as described in the following table:

| Additive | Embodiments (ppm) | | |
|---|---|---|---|
| | A | C | D |
| Detergent/dispersant | 0 to 2500 | 25 to 150 | 500 to 2500 |
| Fluidizer | 0 to 5000 | 1 to 250 | 3000 to 5000 |
| Demulsifier | 0 to 50 | 0.5 to 5 | 1 to 25 |
| Corrosion Inhibitor | 0 to 200 | .5 to 10 | 20 to 200 |
| Antioxidant | 0 to 1000 | 5 to 125 | 500 to 1000 |
| Friction Modifier | 0 to 600 | 50 to 175 | 100 to 750 |
| Fuel | Balance to 100% | Balance to 100% | Balance to 100% |

Oil of Lubricating Viscosity

The lubricating composition comprises an oil of lubricating viscosity. Such oils include natural and synthetic oils, oil derived from hydrocracking, hydrogenation, and hydrofinishing, unrefined, refined, re-refined oils or mixtures thereof. A more detailed description of unrefined, refined and re-refined oils is provided in International Publication WO2008/147704, paragraphs [0054] to [0056](a similar disclosure is provided in US Patent Publication 2010/0197536, see [0072] to [0073]). A more detailed description of natural and synthetic lubricating oils is described in paragraphs [0058] to [0059] respectively of WO2008/147704 (a similar disclosure is provided in US Patent Publication 2010/0197536, see [0075] to [0076]). Synthetic oils may also be produced by Fischer-Tropsch reactions and typically may be hydroisomerized Fischer-Tropsch hydrocarbons or waxes. In one embodiment, oils may be prepared by a Fischer-Tropsch gas-to-liquid synthetic procedure as well as other gas-to-liquid oils.

Oils of lubricating viscosity may also be defined as specified in the April 2008 version of "Appendix E—API Base Oil Interchangeability Guidelines for Passenger Car Motor Oils and Diesel Engine Oils", section 1.3 Subheading 1.3. "Base Stock Categories". The API Guidelines are also summarized in U.S. Pat. No. 7,285,516 (see column 11, line 64 to column 12, line 10). In one embodiment, the oil of lubricating viscosity may be an API Group II, Group III, or Group IV oil, or mixtures thereof. The five base oil groups are as follows:

| Base Oil Category | Sulfur (%) | Saturates (%) | Viscosity Index |
|---|---|---|---|
| Group I | >0.03 and/or | <90 | 80 to 120 |
| Group II | ≤0.03 and | ≥90 | 80 to 120 |
| Group III | ≤0.03 and | ≥90 | ≥120 |
| Group IV | All polyalphaolefins (PAO) | | |
| Group V | All others not included in Groups I, II, III, or IV | | |

The amount of the oil of lubricating viscosity present is typically the balance remaining after subtracting from 100 weight % (wt %) the sum of the amount of the compound of the invention and the other performance additives.

The lubricating composition may be in the form of a concentrate and/or a fully formulated lubricant. If the lubricating composition of the invention (comprising the additives disclosed herein) is in the form of a concentrate which may be combined with additional oil to form, in whole or in part, a finished lubricant, the ratio of the of these additives to the oil of lubricating viscosity and/or to diluent oil include the ranges of 1:99 to 99:1 by weight, or 80:20 to 10:90 by weight.

In one embodiment, the base oil has a kinematic viscosity at 100° C. from 2 mm$^2$/s (centiStokes-cSt) to 16 mm$^2$/s, from 3 mm$^2$/s to 10 mm$^2$/s, or even from 4 mm$^2$/s to 8 mm$^2$/s.

The ability of a base oil to act as a solvent (i.e., solvency) may be a contributing factor in increasing the frequency of LSPI events during operation of a direct fuel-injected engine. Base oil solvency may be measured as the ability of un-additized base oil to act as a solvent for polar constituents. In general, base oil solvency decreases as the base oil group moves from Group I to Group IV (PAO). That is, solvency of base oil may be ranked as follows for oil of a given kinematic viscosity: Group I>Group II>Group III>Group IV. Base oil solvency also decreases as the viscosity increases within a base oil group; base oil of low viscosity tends to have better solvency than similar base oil of higher viscosity. Base oil solvency may be measured by aniline point (ASTM D611).

In one embodiment, the base oil comprises at least 30 wt % of Group II or Group III base oil. In another embodiment, the base oil comprises at least 60 weight % of Group II or Group III base oil, or at least 80 wt % of Group II or Group III base oil. In one embodiment, the lubricant composition comprises less than 20 wt % of Group IV (i.e., polyalphaolefin) base oil. In another embodiment, the base oil comprises less than 10 wt % of Group IV base oil. In one embodiment, the lubricating composition is substantially free of (i.e., contains less than 0.5 wt %) of Group IV base oil.

Ester base fluids, which are characterized as Group V oils, have high levels of solvency as a result of their polar nature. Addition of low levels (typically less than 10 wt %) of ester to a lubricating composition may significantly increase the resulting solvency of the base oil mixture. Esters may be broadly grouped into two categories: synthetic and natural. An ester base fluid would have a kinematic viscosity at 100° C. suitable for use in an engine oil lubricant, such as between 2 cSt and 30 cSt, or from 3 cSt to 20 cSt, or even from 4 cSt to 12 cSt.

Synthetic esters may comprise esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, and alkenyl malonic acids) with any of variety of monohydric alcohols (e.g., butyl alcohol, hexyl alcohol, dodecyl alcohol, 2-ethylhexyl alcohol, ethylene glycol, diethylene glycol monoether, and propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid. Other synthetic esters include those made from C5 to C12 monocarboxylic acids and polyols and polyol ethers such as neopentyl glycol, trimethylolpropane, pentaerythritol, dipentaerythritol, and tripentaerythritol. Esters can also be monoesters of monocarboxylic acids and monohydric alcohols.

Natural (or bio-derived) esters refer to materials derived from a renewable biological resource, organism, or entity, distinct from materials derived from petroleum or equivalent raw materials. Natural esters include fatty acid triglycerides, hydrolyzed or partially hydrolyzed triglycerides, or transesterified triglyceride esters, such as fatty acid methyl ester (or FAME). Suitable triglycerides include, but are not limited to, palm oil, soybean oil, sunflower oil, rapeseed oil, olive oil, linseed oil, and related materials. Other sources of triglycerides include, but are not limited to, algae, animal tallow, and zooplankton. Methods for producing bio-lubricants from natural triglycerides are described in, e.g., United States Patent Publication 2011/0009300A1.

In one embodiment, the lubricating composition comprises at least 2 wt % of an ester base fluid. In one embodiment the lubricating composition of the invention comprises at least 4 wt % of an ester base fluid, or at least 7 wt % of an ester base fluid, or even at least 10 wt % of an ester base fluid.

Boron-Containing Ashless Dispersant

Boron-containing ashless dispersants, are well known in the field of lubricants. Ashless dispersants are so-called because, as supplied, they do not contain metal and thus do not normally contribute to sulfated ash when added to a lubricant. However, they may, interact with ambient metals once they are added to a lubricant which includes a metal-containing species. Ashless dispersants are characterized by a polar group attached to a relatively high molecular weight hydrocarbon chain. Typical ashless dispersants include N-substituted long chain alkenyl succinimides, having a variety of chemical structures, including those represented by Formula (I):

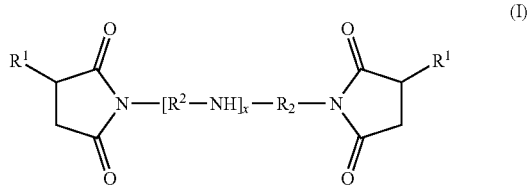

where each $R^1$ is independently an alkyl group, frequently a polyisobutylene group with a molecular weight ($M_n$) of 500-5000 based on the polyisobutylene precursor, and $R^2$ are alkylene groups, commonly ethylene ($C_2H_4$) groups. Succinimides of the invention may be mono-succinimides (i.e., a succinimide as in Formula (I) with a terminal —$NH_2$ group in place of the second succinimide), bis-succinimides (as in Formula (I) above), or mixtures thereof.

Such molecules are commonly derived from reaction of an alkenyl acylating agent with a polyamine, and a wide variety of linkages between the two moieties is possible beside the simple imide structure shown above, including a variety of amides and quaternary ammonium salts. In the above Formula (I), the amine portion is shown as an alkylene polyamine, although other aliphatic and aromatic mono- and polyamines may also be used. Also, a variety of modes of linkage of the $R^1$ groups onto the imide structure are possible, including various cyclic linkages. The ratio of the carbonyl groups of the acylating agent to the nitrogen atoms of the amine may be 1:0.5 to 1:3, and in other instances 1:1 to 1:2.75 or 1:1.5 to 1:2.5. Succinimide dispersants are more fully described in U.S. Pat. Nos. 4,234,435 and 3,172,892 and in EP 0355895.

In certain embodiments, the dispersant is prepared by a process that involves the presence of small amounts of chlorine or other halogen, as described in U.S. Pat. No. 7,615,521 (see, e.g., col. 4, lines 18-60 and preparative example A). Such dispersants typically have some carbocyclic structures in the attachment of the hydrocarbyl substituent to the acidic or amidic "head" group. In other embodiments, the dispersant is prepared by a thermal process involving an "ene" reaction, without the use of any chlorine or other halogen, as described in U.S. Pat. No. 7,615,521; dispersants made in this manner are often derived from high vinylidene (i.e., greater than 50% terminal vinylidene) polyisobutylene (See col. 4, line 61 to col. 5, line 30 and preparative example B). Such dispersants typically do not contain the above-described carbocyclic structures at the point of attachment. In certain embodiments, the dispersant is prepared by free radical catalyzed polymerization of high-vinylidene polyisobutylene with an ethylenically unsaturated acylating agent, as described in U.S. Pat. No. 8,067,347.

Dispersants may be derived from, as the polyolefin, high vinylidene polyisobutylene, that is, having greater than 50, 70, or 75% terminal vinylidene groups (a and p isomers). In certain embodiments, the succinimide dispersant may be prepared by the direct alkylation route. In other embodiments it may comprise a mixture of direct alkylation and chlorine-route dispersants.

Reaction of ethylenically unsaturated acylating agent (preferably maleic anhydride) with a polyolefin to form the acylated polyalkenyl precursor may be carried out such that one or more acylating agents are attached to the polyalkenyl group. When the acylating agent is maleic anhydride, this is described as succination ratio. Dispersants prepared from the stoichiometric reaction of maleic anhydride and a suitable polyolefin may be referred to as mono-succinated. Dispersants prepared from a 2:1 ratio of maleic anhydride to polyolefin may be referred to as di-succinated. The succination ratio of the dispersant may be 1 to 2, or 1.2 to 1.85, or 1.35 to 1.75 succinate moieties per mol of polyolefin.

Suitable dispersants for use in the compositions of the present invention include succinimide dispersants. In one embodiment, the dispersant may be present as a single dispersant. In one embodiment, the dispersant may be present as a mixture of two or three different dispersants, wherein at least one may be a succinimide dispersant.

The succinimide dispersant may be a derivative of an aliphatic polyamine, or mixtures thereof. The aliphatic polyamine may be aliphatic polyamine such as an ethylenepolyamine, a propylenepolyamine, a butylenepolyamine, or mixtures thereof. In one embodiment, the aliphatic polyamine may be ethylenepolyamine. In one embodiment the aliphatic polyamine may be selected from the group consisting of ethylenediamine, diethylenetriamine, triethylenetetramine, tetraethylenepentamine, pentaethylene-hexamine, polyamine still bottoms, and mixtures thereof.

The succinimide dispersant may be a derivative of an aromatic amine, an aromatic polyamine, or mixtures thereof. The aromatic amine may be 4-aminodiphenylamine (ADPA) (also known as N-phenylphenylenediamine), derivatives of ADPA (as described in United States Patent Publications 2011/0306528 and 2010/0298185), a nitroaniline, an aminocarbazole, an amino-indazolinone, an aminopyrimidine, 4-(4-nitrophenylazo)aniline, or combinations thereof. In one embodiment, the dispersant is derivative of an aromatic amine wherein the aromatic amine has at least three non-continuous aromatic rings.

The succinimide dispersant may be a derivative of a polyether amine or polyether polyamine. Typical polyether amine compounds contain at least one ether unit and will be chain terminated with at least one amine moiety. The polyether polyamines can be based on polymers derived from $C_2$-$C_6$ epoxides such as ethylene oxide, propylene oxide, and butylene oxide. Examples of polyether polyamines are sold under the Jeffamine® brand and are commercially available from Hunstman Corporation located in Houston, Texas.

Another class of ashless dispersant is high molecular weight esters. These materials are similar to the above-described succinimides except that they may be seen as having been prepared by reaction of a hydrocarbyl acylating agent and a polyhydric aliphatic alcohol such as glycerol, pentaerythritol, or sorbitol. Such materials are described in more detail in U.S. Pat. No. 3,381,022. Aromatic succinate esters may also be prepared as described in United States Patent Publication 2010/0286414.

A succinic-based dispersant (succinimide, succinamide, succinic ester, and mixtures thereof) may be formed by reacting maleic anhydride or a reactive equivalent thereof, such as an acid or ester, with a hydrocarbon chain by any method such as those disclosed above (e.g., chlorine-based process or thermal process). Other acids or equivalents thereof may be used in place of the maleic anhydride. These include fumaric acid, itaconic acid, itaconic anhydride, citraconic acid, citaconic anhydride, and cinnamic acid as well as other ethylenically unsaturated acids such as acrylic or methacrylic acid; and their reactive equivalents.

Another class of ashless dispersant is Mannich bases. These are materials which are formed by the condensation of a higher molecular weight, alkyl substituted phenol, an alkylene polyamine, and an aldehyde such as formaldehyde. Such materials may have the general structure as represented by Formula (II)

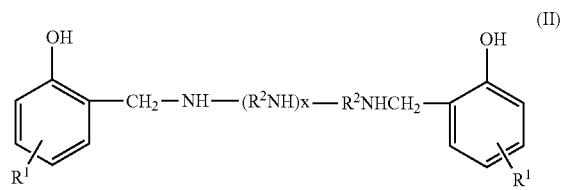

(including a variety of isomers and the like) and are described in more detail in U.S. Pat. No. 3,634,515.

Another class of ashless dispersants include dispersants comprising a quaternary ammonium salt. Quaternary ammonium salts include the reaction product of: (i) a compound comprising at least one tertiary amino group; and (ii) a quaternizing agent suitable for converting the tertiary amino group of compound (i) to a quaternary nitrogen. Examples of suitable quaternary ammonium salts include (i) imide quaternary ammonium salts, (ii) Mannich quaternary ammonium salts, (iii) polyalkene substituted amine quaternary ammonium salts, (iv) amide quaternary ammonium salts, (v) ester quaternary ammonium salts, (vi) polyester quaternary ammonium salts, or (vii) any combination thereof.

These various types of quaternary ammonium salts may be prepared in any number of ways but generally are prepared by reacting a non-quaternized nitrogen-containing compound with a quaternizing agent. Each of the different types of quaternary ammonium salts described uses a different non-quaternized nitrogen-containing compound in its preparation, but generally the non-quaternized nitrogen-containing compound contains a tertiary nitrogen capable of being quaternized (or a primary or secondary nitrogen atom that can be alkylated to a tertiary nitrogen that can then be quaternized) and a hydrocarbyl substituent group. The preparation and use of quaternized ammonium dispersants is described in detail in U.S. Pat. Nos. 7,951,211 and 7,906,470.

The boron-containing dispersant may be any of the above-mentioned ashless dispersants, preferably polyisobutenylsuccinimide dispersants, which are reacted with a borating (or boronating) agent, resulting in incorporation or association of boron or a boron-containing moiety with the ashless dispersant.

Boron-containing dispersants (i.e., borated dispersants) may be known to the skilled person and may be prepared by reacting a borating agent, such as boric acid, with a polyalkenyl succinimide, preferably a polyisobutenyl succinimide. Other suitable borating agents include trialkyl borate esters and alkali metal borates. The borated dispersant may have a carbonyl to nitrogen ratio of 1:1 to 1:5, or 1:1 to 1:4, or 1:1.3 to 1:3 or 1:1.5 to 1:2, or 1:1.4 to 1:0.6.

The borated dispersant may additionally be post-treated by other conventional methods by a reaction with any of a variety of agents. Among these are urea, thiourea, dimercaptothiadiazoles, carbon disulfide, aldehydes, ketones, carboxylic acids, hydrocarbon-substituted succinic anhydrides, maleic anhydride, nitriles, epoxides, and phosphorus compounds.

The boron-containing dispersant may also exhibit basicity, as measured by Total Base Number (TBN). TBN may be determined by ASTM D2896. This will particularly be the case if the dispersant is prepared with an amine, such as a polyamine, and the amine contains one or more amino groups that have not reacted with acidic groups of the dispersant. In some embodiments, the TBN of the dispersant may be 1 to 110, or 5 to 50, or 10 to 40 or 30 to 70. In some embodiments, however, the dispersant may not exhibit basicity (that is, have a TBN of 0 or nearly 0). In one embodiment the dispersant has a TBN of zero as measured by D2896. Such could be the case if no basic nitrogen is present on the dispersant The boron-containing dispersant may be present at 0.01 wt % to 20 wt %, or 0.1 wt % to 15 wt %, or 0.1 wt % to 10 wt %, or 0.5 wt % to 8 wt %, or 1.0 wt % to 6.5 wt %, or 0.5 wt % to 2.2 wt % of the lubricating composition.

The boron-containing dispersant may be present in an amount to deliver boron to the composition at 15 ppm to 2000 ppm, or 25 ppm to 1000 ppm, or 40 ppm to 600 ppm, or 80 ppm to 350 ppm.

Other Performance Additives

The compositions of the invention may optionally comprise one or more additional performance additives. These additional performance additives may include one or more metal deactivators, viscosity modifiers, detergents, friction modifiers, antiwear agents, corrosion inhibitors, boron-free dispersants, dispersant viscosity modifiers, extreme pressure agents, antioxidants, foam inhibitors, demulsifiers, pour point depressants, seal swelling agents, and any combination or mixture thereof. Typically, fully-formulated lubricating oil will contain one or more of these performance additives, and often a package of multiple performance additives.

In one embodiment, the invention provides a lubricating composition further comprising an antiwear agent, a dispersant viscosity modifier, a friction modifier, a viscosity modifier, an antioxidant, an overbased detergent, a boron-free dispersant, or a combination thereof, where each of the additives listed may be a mixture of two or more of that type of additive. In one embodiment, the invention provides a lubricating composition further comprising an antiwear agent, a dispersant viscosity modifier, a friction modifier, a viscosity modifier (typically an olefin copolymer such as an ethylene-propylene copolymer), an antioxidant (including phenolic and aminic antioxidants), an overbased detergent (including overbased sulfonates and phenates), or a combination thereof, where each of the additives listed may be a mixture of two or more of that type of additive.

In one embodiment, the invention provides a lubricating composition further comprising a boron-free ashless dispersant. The boron-free dispersant may be the same or different than the borated dispersant of the invention. In one embodiment, the boron-free dispersant may be present in the lubricant in an amount 0.1 weight percent to 5 weight percent of the composition, or 0.25 to 2.4 weight percent, or 1.0 to 3.0 weight percent of the composition. In one embodiment, the lubricating composition may include one or more boron-containing dispersants and one or more boron-free dispersants, wherein the total amount of dispersant may be 0.01 wt % to 20 wt %, or 0.1 wt % to 15 wt %, or 0.1 wt % to 10 wt %, or 0.5 wt % to 8 wt %, or 1.0 wt % to 6.5 wt %, or 0.5 wt % to 2.2 wt % of the lubricating composition and wherein the ratio of borated dispersant to boron-free dispersant may be 1:10 to 10:1 (weight:weight) or 1:5 to 3:1 or 1:3 to 2:1.

Another additive is an antiwear agent. Examples of antiwear agents include phosphorus-containing antiwear/extreme pressure agents such as metal thiophosphates, phosphoric acid esters and salts thereof, phosphorus-containing carboxylic acids, esters, ethers, and amides, and phosphites. In certain embodiments a phosphorus antiwear agent may be present in an amount to deliver 0.01 to 0.2 or 0.015 to 0.15 or 0.02 to 0.1 or 0.025 to 0.08 percent phosphorus. Often the antiwear agent is a zinc dialkyldithiophosphate (ZDP).

Zinc dialkyldithiophosphates may be described as primary zinc dialkyldithiophosphates or as secondary zinc dialkyldithiophosphates, depending on the structure of the alcohol used in its preparation. In some embodiments the compositions of the invention include primary zinc dialkyldithiophosphates. In some embodiments the compositions of the invention include secondary zinc dialkyldithiophosphates. In some embodiments the compositions of the invention include a mixture of primary and secondary zinc dialkyldithiophosphates. In some embodiments component (b) is a mixture of primary and secondary zinc dialkyldithiophosphates where the ratio of primary zinc dialkyldithiophosphates to secondary zinc dialkyldithiophosphates (one a weight basis) is at least 1:1, or even at least 1:1.2, or even at least 1:1.5 or 1:2, or 1:10. In some embodiments, component (b) is a mixture of primary and secondary zinc dialkyldithiophosphates that is at least 50 percent by weight primary, or even at least 60, 70, 80, or even 90 percent by weight primary. In some embodiments component (b) is free of primary zinc dialkyldithiophosphates.

The phosphorus antiwear agent may be present at 0 wt % to 3 wt %, or 0.1 wt % to 1.5 wt %, or 0.5 wt % to 0.9 wt % of the lubricating composition.

In one embodiment, the invention provides a lubricating composition which further comprises ashless antioxidant. Ashless antioxidants may comprise one or more of arylamines, diarylamines, alkylated arylamines, alkylated diaryl amines, phenols, hindered phenols, sulfurized olefins, or mixtures thereof. In one embodiment the lubricating composition includes an antioxidant, or mixtures thereof. The antioxidant may be present at 0 wt % to 15 wt %, or 0.1 wt % to 10 wt %, or 0.5 wt % to 5 wt %, or 0.5 wt % to 3 wt %, or 0.3 wt % to 1.5 wt % of the lubricating composition.

The diarylamine or alkylated diarylamine may be a phenyl-α-naphthylamine (PANA), an alkylated diphenylamine, or an alkylated phenylnapthylamine, or mixtures thereof. The alkylated diphenylamine may include di-nonylated diphenylamine, nonyl diphenylamine, octyl diphenylamine, di-octylated diphenylamine, di-decylated diphenylamine, decyl diphenylamine and mixtures thereof. In one embodiment, the diphenylamine may include nonyl diphenylamine, dinonyl diphenylamine, octyl diphenylamine, dioctyl diphenylamine, or mixtures thereof. In one embodiment the alkylated diphenylamine may include nonyl diphenylamine, or dinonyl diphenylamine. The alkylated diarylamine may include octyl, di-octyl, nonyl, di-nonyl, decyl or di-decyl phenylnapthylamines.

The diarylamine antioxidant of the invention may be present on a weight basis of the lubrication composition at 0.1% to 10%, 0.35% to 5%, or even 0.5% to 2%.

The phenolic antioxidant may be a simple alkyl phenol, a hindered phenol, or coupled phenolic compounds.

The hindered phenol antioxidant often contains a secondary butyl and/or a tertiary butyl group as a sterically hindering group. The phenol group may be further substituted with a hydrocarbyl group (typically linear or branched alkyl) and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, 4-dodecyl-2,6-di-tert-butylphenol, or butyl 3-(3,5-ditert-butyl-4-hydroxyphenyl)propanoate. In one embodiment, the hindered phenol antioxidant may be an ester and may include, e.g., Irganox™ L-135 from Ciba.

Coupled phenols often contain two alkylphenols coupled with alkylene groups to form bisphenol compounds. Examples of suitable coupled phenol compounds include 4,4'- methylene bis-(2,6-di-tert-butyl phenol), 4-methyl-2,6-di-tert-butylphenol, 2,2'-bis-(6-t-butyl-4-heptylphenol); 4,4'-bis(2,6-di-t-butyl phenol), 2,2'-methylenebis(4-methyl-6-t-butylphenol), and 2,2'-methylene bis(4-ethyl-6-t-butylphenol).

Phenols of the invention also include polyhydric aromatic compounds and their derivatives. Examples of suitable polyhydric aromatic compounds include esters and amides of gallic acid, 2,5-dihydroxybenzoic acid, 2,6-dihydroxybenzoic acid, 1,4-dihydroxy-2-naphthoic acid, 3,5-dihydroxynaphthoic acid, 3,7-dihydroxy naphthoic acid, and mixtures thereof.

In one embodiment, the phenolic antioxidant comprises a hindered phenol. In another embodiment the hindered phenol is derived from 2,6-ditertbutyl phenol.

In one embodiment, the lubricating composition of the invention comprises a phenolic antioxidant in a range of 0.01 wt % to 5 wt %, or 0.1 wt % to 4 wt %, or 0.2 wt % to 3 wt %, or 0.5 wt % to 2 wt % of the lubricating composition.

Sulfurized olefins are well known commercial materials, and those which are substantially nitrogen-free, that is, not containing nitrogen functionality, are readily available. The olefinic compounds which may be sulfurized are diverse in nature. They contain at least one olefinic double bond, which is defined as a non-aromatic double bond; that is, one connecting two aliphatic carbon atoms. These materials generally have sulfide linkages having 1 to 10 sulfur atoms, for instance, 1 to 4, or 1 or 2.

Ashless antioxidants may be used separately or in combination. In one embodiment of the invention, two or more different antioxidants are used in combination, such that there is at least 0.1 weight percent of each of the at least two antioxidants and wherein the combined amount of the ashless antioxidants is 0.5 to 5 weight percent. In one embodiment, there may be at least 0.25 to 3 weight percent of each ashless antioxidant.

In one embodiment, the invention provides a lubricating composition further comprising a molybdenum compound. The molybdenum compound may be selected from the group consisting of molybdenum dialkyldithiophosphates, molybdenum dithiocarbamates, amine salts of molybdenum compounds, and mixtures thereof. The molybdenum compound may provide the lubricating composition with 0 to 1000 ppm, or 5 to 1000 ppm, or 10 to 750 ppm, or 5 ppm to 300 ppm, or 20 ppm to 250 ppm of molybdenum.

In one embodiment, the lubricating composition of the invention further comprises a dispersant viscosity modifier. The dispersant viscosity modifier may be present at 0 wt % to 5 wt %, or 0 wt % to 4 wt %, or 0.05 wt % to 2 wt % of the lubricating composition.

Suitable dispersant viscosity modifiers include functionalized polyolefins, for example, ethylene-propylene copolymers that have been functionalized with an acylating agent such as maleic anhydride and an amine; polymethacrylates functionalized with an amine, or esterified styrene-maleic anhydride copolymers reacted with an amine. More detailed description of dispersant viscosity modifiers are disclosed in International Publication WO2006/015130 or U.S. Pat. Nos. 4,863,623; 6,107,257; 6,107,258; and 6,117,825. In one embodiment, the dispersant viscosity modifier may include those described in U.S. Pat. No. 4,863,623 (see column 2, line 15 to column 3, line 52) or in International Publication WO2006/015130 (see page 2, paragraph [0008] and preparative examples are described at paragraphs [0065] to [0073]).

In one embodiment, the invention provides a lubricating composition further comprising a metal-containing detergent. The metal-containing detergent may be an overbased detergent. Overbased detergents otherwise referred to as overbased or superbased salts are characterized by a metal content in excess of that which would be necessary for neutralization according to the stoichiometry of the metal and the particular acidic organic compound reacted with the metal. The overbased detergent may be selected from the group consisting of non-sulfur containing phenates, sulfur containing phenates, sulfonates, salixarates, salicylates, and mixtures thereof.

The metal-containing detergent may also include "hybrid" detergents formed with mixed surfactant systems including phenate and/or sulfonate components, e.g., phenate/salicylates, sulfonate/phenates, sulfonate/salicylates, sulfonates/phenates/salicylates, as described, for example, in U.S. Pat. Nos. 6,429,178; 6,429,179; 6,153,565; and 6,281,179. Where, for example, a hybrid sulfonate/phenate detergent is employed, the hybrid detergent would be considered equivalent to amounts of distinct phenate and sulfonate detergents introducing like amounts of phenate and sulfonate soaps, respectively.

The overbased metal-containing detergent may be sodium salts, calcium salts, magnesium salts, or mixtures thereof of the phenates, sulfur-containing phenates, sulfonates, salixarates and salicylates. Overbased phenates and salicylates typically have a total base number of 180 to 450 TBN. Overbased sulfonates typically have a total base number of 250 to 600, or 300 to 500. Overbased detergents are known in the art. In one embodiment, the sulfonate detergent may be predominantly a linear alkylbenzene sulfonate detergent having a metal ratio of at least 8 as is described in paragraphs [0026] to [0037] of US Patent Publication 2005065045 (and granted as U.S. Pat. No. 7,407,919). The linear alkylbenzene sulfonate detergent may be particularly useful for assisting in improving fuel economy. The linear alkyl group may be attached to the benzene ring anywhere along the linear chain of the alkyl group, but often in the 2, 3 or 4 position of the linear chain, and in some instances, predominantly in the 2 position, resulting in the linear alkylbenzene sulfonate detergent. Overbased detergents are known in the art. The overbased detergent may be present at 0 wt % to 15 wt %, or 0.1 wt % to 10 wt %, or 0.2 wt % to 8 wt %, or 0.2 wt % to 3 wt %. For example, in a heavy duty diesel engine, the detergent may be present at 2 wt % to 3 wt % of the lubricating composition. For a passenger car engine, the detergent may be present at 0.2 wt % to 1 wt % of the lubricating composition.

Metal-containing detergents contribute sulfated ash to a lubricating composition. Sulfated ash may be determined by ASTM D874. In one embodiment, the lubricating composition of the invention comprises a metal-containing detergent in an amount to deliver at least 0.4 weight percent sulfated ash to the total composition. In another embodiment, the metal-containing detergent is present in an amount to deliver at least 0.6 weight percent sulfated ash, or at least 0.75 weight percent sulfated ash, or even at least 0.9 weight percent sulfated ash to the lubricating composition.

In one embodiment, the invention provides a lubricating composition further comprising a friction modifier. Examples of friction modifiers include long chain fatty acid derivatives of amines, fatty esters, or epoxides; fatty imidazolines such as condensation products of carboxylic acids and polyalkylene-polyamines; amine salts of alkylphosphoric acids; fatty alkyl tartrates; fatty alkyl tartrimides; or fatty alkyl tartramides. The term fatty, as used herein, can mean having a $C_8$-22 linear alkyl group.

Friction modifiers may also encompass materials such as sulfurized fatty compounds and olefins, molybdenum dialkyldithiophosphates, molybdenum dithiocarbamates, sunflower oil or monoester of a polyol and an aliphatic carboxylic acid.

In one embodiment the friction modifier may be selected from the group consisting of long chain fatty acid derivatives of amines, long chain fatty esters, or long chain fatty epoxides; fatty imidazolines; amine salts of alkylphosphoric acids; fatty alkyl tartrates; fatty alkyl tartrimides; and fatty alkyl tartramides. The friction modifier may be present at 0 wt % to 6 wt %, or 0.05 wt % to 4 wt %, or 0.1 wt % to 2 wt % of the lubricating composition.

In one embodiment, the friction modifier may be a long chain fatty acid ester. In another embodiment the long chain fatty acid ester may be a mono-ester or a diester or a mixture thereof, and in another embodiment the long chain fatty acid ester may be a triglyceride.

Other performance additives such as corrosion inhibitors include those described in paragraphs 5 to 8 of US Application U.S. Ser. No. 05/038,319, published as WO2006/047486, octyl octanamide, condensation products of dodecenyl succinic acid or anhydride and a fatty acid such as oleic acid with a polyamine. In one embodiment, the corrosion inhibitors include the Synalox® (a registered trademark of The Dow Chemical Company) corrosion inhibitor. The Synalox® corrosion inhibitor may be a homopolymer or copolymer of propylene oxide. The Synalox® corrosion inhibitor is described in more detail in a product brochure with Form No. 118-01453-0702 AMS, published by The Dow Chemical Company. The product brochure is entitled "SYNALOX Lubricants, High-Performance Polyglycols for Demanding Applications".

The lubricating composition may further include metal deactivators, including derivatives of benzotriazoles (typically tolyltriazole), dimercaptothiadiazole derivatives, 1,2,4-triazoles, benzimidazoles, 2-alkyldithiobenzimidazoles, or 2-alkyldithio-benzothiazoles; foam inhibitors, including copolymers of ethyl acrylate and 2-ethylhexylacrylate and copolymers of ethyl acrylate and 2-ethylhexylacrylate and vinyl acetate; demulsifiers including trialkyl phosphates, polyethylene glycols, polyethylene oxides, polypropylene oxides and (ethylene oxide-propylene oxide) polymers; and pour point depressants, including esters of maleic anhydride-styrene, polymethacrylates, polyacrylates or polyacrylamides.

Pour point depressants that may be useful in the compositions of the invention further include polyalphaolefins, esters of maleic anhydride-styrene, poly(meth)acrylates, polyacrylates or polyacrylamides.

In different embodiments the lubricating composition may have a composition as described in the following table:

| Additive | Embodiments (wt %) | | |
|---|---|---|---|
| | A | B | C |
| Borated Dispersant of the invention | 0.05 to 12 | 0.75 to 8 | 0.5 to 6 |
| Boron-free Dispersant | 0.0 to 5 | 0.15 to 4 | 0.5 to 2 |
| Antioxidant | 0.05 to 1 | 0.2 to 3 | 0.5 to 2 |
| Dispersant Viscosity Modifier | 0 or 0.05 to 5 | 0 or 0.05 to 4 | 0.05 to 2 |
| Overbased Detergent | 0 or 0.05 to 15 | 0.1 to 10 | 0.2 to 8 |
| Antiwear Agent | 0 or 0.05 to 15 | 0.1 to 10 | 0.3 to 5 |
| Friction Modifier | 0 or 0.05 to 6 | 0.05 to 4 | 0.1 to 2 |
| Viscosity Modifier | 0 or 0.05 to 10 | 0.5 to 8 | 1 to 6 |
| Any Other Performance Additive | 0 or 0.05 to 10 | 0 or 0.05 to 8 | 0 or 0.05 to 6 |
| Oil of Lubricating Viscosity | Balance to 100% | Balance to 100% | Balance to 100% |

The present invention provides a surprising ability to prevent damage to an engine in operation due to pre-ignition events resulting from direct gasoline injection into the combustion chamber. This is accomplished while maintaining fuel economy performance, low sulfated ash levels, and other limitations, required by increasingly stringent government regulations.

Industrial Application

As described above, the invention provides for a method of lubricating an internal combustion engine comprising supplying to the internal combustion engine a lubricating composition as disclosed herein. Generally, the lubricant is added to the lubricating system of the internal combustion engine, which then delivers the lubricating composition to the critical parts of the engine, during its operation, that require lubrication.

The lubricating compositions described above may be utilized in an internal combustion engine. The engine components may have a surface of steel or aluminum (typically a surface of steel) and may also be coated for example with a diamond-like carbon (DLC) coating.

An aluminum surface may be comprised of an aluminum alloy that may be a eutectic or hyper-eutectic aluminum alloy (such as those derived from aluminum silicates, aluminum oxides, or other ceramic materials). The aluminum surface may be present on a cylinder bore, cylinder block, or piston ring having an aluminum alloy, or aluminum composite.

The internal combustion engine may be fitted with an emission control system or a turbocharger. Examples of the emission control system include diesel particulate filters (DPF), or systems employing selective catalytic reduction (SCR).

The internal combustion engine of the present invention is distinct from a gas turbine. In an internal combustion engine, individual combustion events translate from a linear reciprocating force into a rotational torque through the rod and crankshaft. In contrast, in a gas turbine (which may also be referred to as a jet engine) a continuous combustion process generates a rotational torque continuously without translation and can also develop thrust at the exhaust outlet. These differences in operation conditions of a gas turbine and internal combustion engine result in different operating environments and stresses.

The lubricant composition for an internal combustion engine may be suitable for any engine lubricant irrespective of the sulfur, phosphorus or sulfated ash (ASTM D-874) content. The sulfur content of the engine oil lubricant may be 1 wt % or less, or 0.8 wt % or less, or 0.5 wt % or less, or 0.3 wt % or less. In one embodiment, the sulfur content may be in the range of 0.001 wt % to 0.5 wt %, or 0.01 wt % to 0.3 wt %. The phosphorus content may be 0.2 wt % or less, or 0.12 wt % or less, or 0.1 wt % or less, or 0.085 wt % or less, or 0.08 wt % or less, or even 0.06 wt % or less, 0.055 wt % or less, or 0.05 wt % or less. In one embodiment the phosphorus content may be 100 ppm to 1000 ppm, or 200 ppm to 600 ppm. The total sulfated ash content may be 2 wt % or less, or 1.5 wt % or less, or 1.1 wt % or less, or 1 wt % or less, or 0.8 wt % or less, or 0.5 wt % or less, or 0.4 wt % or less. In one embodiment, the sulfated ash content may be 0.05 wt % to 0.9 wt %, or 0.1 wt % to 0.2 wt % or to 0.45 wt %.

In one embodiment, the lubricating composition may be an engine oil, wherein the lubricating composition may be characterized as having at least one of (i) a sulfur content of 0.5 wt % or less, (ii) a phosphorus content of 0.1 wt % or less, (iii) a sulfated ash content of 1.5 wt % or less, or combinations thereof.

Examples

The invention will be further illustrated by the following examples, which set forth particularly advantageous embodiments. While the examples are provided to illustrate the invention, they are not intended to limit it.

Lubricating Compositions

A series of 5W-20 engine lubricants in Group II base oil of lubricating viscosity are prepared containing the ashless dispersant additives described above as well as conventional additives including polymeric viscosity modifier, overbased detergents, antioxidants (combination of phenolic ester and diarylamine), zinc dialkyldithiophosphate (ZDDP), as well as other performance additives as set forth in Table 1. The phosphorus, sulfur and ash contents of each of the examples are also presented in the Table in part to show that each example has a similar amount of these materials and so provide a proper comparison between the comparative and invention examples.

TABLE 1

Lubricating Oil Composition Formulations

| | COMP EX1 | INV EX2 | INV EX3 | INV EX4 | INV EX5 | INV EX6 |
|---|---|---|---|---|---|---|
| Group III Base Oil | | | Balance to = 100% | | | |
| Dispersant 1[2] | 0.8 | 1.2 | 2.0 | | 3.6 | 2.4 |
| Dispersant 2[3] | | | | 4.6 | | |
| Ashless Antioxidant[4] | 2.0 | 0.725 | 1.4 | 2.0 | 2.18 | 4.0 |
| Ca Detergent[5] | 0.75 | 0.37 | 1.13 | 0.06 | 1.11 | 0.74 |
| Ca Phenate[6] | 0 | 0 | 0 | 1.4 | 0 | 0 |
| Na Sulfonate | 0.18 | 0.09 | 0 | 0 | 0.26 | 0.18 |
| ZDDP | 0.76 | 0.4 | 0.7 | 0.45 | 1.1 | 0.76 |
| VI Improver | 1.0 | 1.0 | 2.1 | 1.1 | 1.0 | 0.55 |
| Additional Additives[7] | 1.0 | 0.85 | 1.4 | 0.58 | 2.1 | 2.0 |
| % Phosphorus | 0.076 | 0.038 | 0.060 | 0.046 | 0.11 | 0.076 |
| % Calcium | 0.168 | 0.084 | 0.234 | 0.123 | 0.251 | 0.168 |
| % Sodium | 0.049 | 0.024 | 0 | 0 | 0.073 | 0.049 |
| % Molybdenum (ppm) | 0 | 46 | 0 | 0 | 140 | 90 |
| TBN | 10.8 | 3.84 | 7.75 | 6.1 | 11.5 | 10.8 |
| % Ash | 0.9 | 0.44 | 0.9 | 0.50 | 1.31 | 0.88 |

1 - All amounts shown above are in weight percent and are on an oil-free basis unless otherwise noted

[2] PIBsuccinimide Dispersant, prepared from 2000 Mn polyisobutylene, sucinated in a conventional chlorine process to form a "mid-succan" with 1.3-1.6 succination ratio, and aminated with polyethylene polyamines; TBN = 28

[3] PIBsuccinimide Dispersant, prepared from 1500 Mn high vinylidene polyisobutylene, thermally succinated, and aminated with polyethylene polyamines; TBN = 20

[4] Combination of diarylamine and hindered phenol antioxidants

[5] Ca Detergent is one or more overbased calcium alkylbenzene sulfonic acid with TBN at least 300 and metal ratio at least 10

[6] Ca Phenate is 145 TBN calcium phenate

[7] The Additional Additives used in the examples includes a dispersant, and an antifoam agent, and includes some amount of diluent oil. The same Additive package is used in each of the examples

TABLE 2

Lubricating Oil Composition Formulations[1]

| | EX7 | EX8 | EX9 | EX10 | EX11 | EX12 |
|---|---|---|---|---|---|---|
| Viscosity Grade | | 5W-30 | | | 10W-30 | |
| Base Oil | Group III (Balance to = 100%) | | | Group II (Balance to 100%) | | |
| Borated Dispersant[2] | | | | 1 | 1 | 1.5 |
| Boron-free Dispersant[3] | 2 | 2.7 | 2.0 | | | |
| Boron-free Dispersant[4] | | | | 2.35 | 2.35 | 2.35 |
| Ca Sulfonate[5] | 2.78 | 2.78 | 0.29 | 0.22 | 0.22 | 0.32 |
| Ca Sulfonate[6] | | | | 0.9 | 0.9 | 0.9 |
| Mg Detergent[7] | | | 2.92 | 0.81 | 0.81 | 0.71 |
| Calcium Phenate[8] | | | | | | 0.71 |
| DVM Booster | | | | 0.25 | 0.58 | 0.58 |
| Hindered phenol | 0.25 | 0.5 | 05 | 1 | 1 | 1 |
| Diarylamine | 0.5 | 0.9 | 0.35 | 1.75 | 0 | 0 |
| Sulfurized Olefin | 0.9 | 0.2 | | 0.25 | 0.25 | 0.25 |
| ZDDP | 0.32 | 0.32 | 0.32 | 0.77 | 0.77 | 0.77 |
| VI Improver | 0.6 | 0.6 | 0.4 | 0.05 | 0.05 | 0.08 |
| Additional Additives[9] | 0.46 | 0.73 | 0.36 | 0.16 | 0.16 | 0.16 |
| % Phosphorus | 0.03 | 0.03 | 0.03 | 0.075 | 0.074 | 0.079 |
| % Calcium | 0.71 | 0.71 | 0.064 | 0.128 | 0.126 | 0.150 |
| % Magnesium | 0 | 0 | 0.42 | 0.075 | 0.072 | 0.062 |
| % Boron (ppm) | 0 | 0 | 0 | 96 | 101 | 148 |

[1] All amounts shown above are in weight percent and are on an oil-free basis unless otherwise noted.

[2] Borated Polyisobutylene (Mn 2300) based succinimide dispersant prepared with ethylene polyamines (TBN 498); 1.0% Boron, Boron:Nitrogen 0.4:1

[3] Polyisobutylene (Mn 2300) based succinimide dispersant prepared with ethylene polyamines (TBN = 28)

[4] Polyisobutylene (Mn 2300) based succinimide dispersant prepared with a mixture of ethylene polyamines and polyaromatic polyamines

[5] Ca Detergent is one or more overbased calcium alkylbenzene sulfonic acid with TBN at least 300 and metal ratio at least 10

[6] High substrate calcium alkylbenzene sulfonate (metal ratio 2.8)

[7] Combination of overbased magnesium alkylbenzene sulfonate and magnesium sulfur-free phenate detergents

[8] Calcium overbased sulfur-coupled alkylphenol detergent

[9] The Additional Additives used in the examples may include friction modifiers, pour point depressants, anti-foam agents, corrosion inhibitors, TBN boosters, and includes some amount of diluent oil.

Testing

Low Speed Pre-Ignition events are measured in two engines, a Ford 2.0 L Ecoboost engine and a GM 2.0 L Ecotec. Both of these engines are turbocharged gasoline direct injection (GDI) engines. The Ford Ecoboost engine is operated in two stages. In the first stage, the engine is operated at 1500 rpm and 14.4 bar brake mean effective pressure (BMEP). During the second stage, the engine is operated at 1750 rpm and 17.0 bar BMEP. The engine is run for 25,000 combustion cycles in each stage, and LSPI events are counted.

The GM Ecotec engine is operated at 2000 rpm and 22.0 bar BMEP with an oil sump temperature of 100° C. The test consists of nine phases of 15,000 combustion cycles with each phase separated by an idle period. Thus, combustion events are counted over 135,000 combustion cycles.

LSPI events are determined by monitoring peak cylinder pressure (PP) and mass fraction burn (MFB) of the fuel charge in the cylinder. When both criteria are met, it is determined that an LSPI event has occurred. The threshold for peak cylinder pressure is typically 9,000 to 10,000 kPa. The threshold for MFB is typically such that at least 2% of the fuel charge is burned late, i.e., 5.5 degrees After Top Dead Center (ATDC). LSPI events can be reported as events per 100,000 combustion cycles, events per cycle, and/or combustion cycles per event.

TABLE 4

GM Ecotec LSPI Testing

|  | EX7 | EX8 | EX9 | EX10 | EX11 | EX12 |
|---|---|---|---|---|---|---|
| PP Events | 18 | 26 | 4 | 0 | 0 | 0 |
| MFB Events | 21 | 29 | 3 | 0 | 0 | 0 |
| Total Events | 18 | 26 | 3 | 0 | 0 | 0 |
| Total Cycles | 135,000 | 135,000 | 135,000 | 135,000 | 135,000 | 135,000 |
| Ave. PP | 18,900 | 18,400 | 17370 | 6663 | 6675 | 6554 |
| Events per 100,000 cycles | 13.3 | 19.2 | 2.2 | 0 | 0 | 0 |
| Cycles per event | 7500 | 5192 | 45000 | N/A | N/A | N/A |

The data indicates that addition of borated dispersant to a formulation, especially a formulation already containing a magnesium detergent, results in significant reduction of LSPI events.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference, as is the priority document and all related applications, if any, which this application claims the benefit of. Except in the Examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, byproducts, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulphoxy);

(iii) hetero substituents, that is, substituents which, while having a predominantly hydrocarbon character, in the context of this invention, contain other than carbon in a ring or chain otherwise composed of carbon atoms.

Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A method for reducing low speed pre-ignition events in a spark-ignited direct injection internal combustion engine comprising:
    operating the engine under a load with a brake mean effective pressure (BMEP) of greater than or equal to 10 bars at speeds less than or equal to 3,000 rpm; and
    supplying to the engine a lubricant composition comprising:
        a base oil of lubricating viscosity;
        0.5 to 2.2 wt % of a boron-containing ashless dispersant;
        0.1 to 3 wt % of at least one ashless antioxidant; and
        0.2 to 1 wt % of a magnesium salicylate detergent.

2. The method of claim 1, wherein the engine is fueled with a liquid hydrocarbon fuel, a liquid non-hydrocarbon fuel, or mixtures thereof.

3. The method of claim 2, wherein the engine is fueled by natural gas, liquefied petroleum gas (LPG), compressed natural gas (CNG), or mixtures thereof.

4. The method of claim 1, wherein the boron-containing ashless dispersant is a polyalkenyl dispersant derived from acylated polyisobutylene.

5. The method of claim 1, wherein the boron-containing ashless dispersant comprises a polyisobutylene succinimide compound.

6. The method of claim 5, wherein the polyisobutylene succinimide compound is prepared from an amine comprising one or more of aliphatic polyamines, aromatic amines, polyether amines, and mixtures thereof.

7. The method of claim 4, wherein the acylated polyisobutylene is prepared by a chlorine process, a thermal process, a free radical polymerization process, or combinations thereof.

8. The method of claim 1, further comprising from 0.1 to 5 wt % of a boron-free ashless dispersant.

9. The method of claim 8, wherein the boron-free ashless dispersant is a polyisobutylene succinimide dispersant prepared from a polyisobutylene having an average number molecular weight ($M_n$) of from 500 to 5000.

10. The method of claim 1, wherein the at least one ashless antioxidant is a sulfurized olefin.

11. The method of claim 1, wherein the at least one ashless antioxidant includes two or more antioxidants where each antioxidant is present in the lubricating composition in an amount of at least 0.1 wt %.

12. The method of claim 11, wherein the total amount of antioxidant present in the lubricating composition is from 0.5 to 5 wt %.

13. The method of claim 12, wherein each antioxidant is present in an amount of 0.25 to 3 wt %.

14. The method of claim 1, wherein the lubricant composition further comprises at least one other additive selected from a metal containing overbased detergent, a phosphorus-containing anti-wear additive, a friction modifier, and a polymeric viscosity modifier.

15. The method of claim 1, wherein the lubricating composition comprises at least 50 weight % of Group II base oil, Group III base oil, or mixtures thereof.

* * * * *